United States Patent
Rimboeck et al.

(10) Patent No.: US 11,767,335 B2
(45) Date of Patent: Sep. 26, 2023

(54) METHOD FOR PREPARING ORGANOCHLOROSILANES

(71) Applicant: WACKER CHEMIE AG, Munich (DE)

(72) Inventors: Karl-Heinz Rimboeck, Heldenstein (DE); Michael Mueller, Burghausen (DE); Natalia Sofina, Burghausen (DE)

(73) Assignee: Wacker Chemie AG, Munich (DE)

( * ) Notice: Subject to any disclaimer, the term of this patent is extended or adjusted under 35 U.S.C. 154(b) by 185 days.

(21) Appl. No.: 17/438,004

(22) PCT Filed: Mar. 12, 2019

(86) PCT No.: PCT/EP2019/056164
§ 371 (c)(1),
(2) Date: Sep. 10, 2021

(87) PCT Pub. No.: WO2020/182299
PCT Pub. Date: Sep. 17, 2020

(65) Prior Publication Data
US 2022/0242887 A1 Aug. 4, 2022

(51) Int. Cl.
*C07F 7/16* (2006.01)

(52) U.S. Cl.
CPC ..................... *C07F 7/16* (2013.01)

(58) Field of Classification Search
CPC ................ B01J 23/72; C07F 7/16; C07F 7/02
See application file for complete search history.

(56) References Cited

U.S. PATENT DOCUMENTS

| | | | |
|---|---|---|---|
| 2017/0267702 A1* | 9/2017 | Barr | B01J 23/06 |
| 2019/0127398 A1 | 5/2019 | Mueller et al. | |
| 2022/0041455 A1* | 2/2022 | Rimboeck | C01B 33/107 |
| 2022/0073357 A1* | 3/2022 | Rimboeck | C01B 33/107 |

FOREIGN PATENT DOCUMENTS

WO 17178080 A1 10/2017

OTHER PUBLICATIONS

B. Kanner, K. M. Lewis, ,,Commercial Production of Silanes by the Direct Synthesis; Studies in Organic Chemistry—Catalyzed Direst Reactions of Silicion, Elsevier Science Publishers B.V.,1993, 49, 1-46.
W.-D. Hergeth, On-Line Monitoring of Chemical Reactions, Ullmanns Encyclopedia of Industrial Chemistry; Wiley, Weinheim, 2006.
Bangert et al., Optimization of Muller-Rochow Synthesis of Silanes, Jan. 1, 2010.
Kalchauer et al., Muller-Rochow Synthesis, "The Direct Process to Methylchlorosilanes," Jan. 1, 2008.
Kuzmin et al., Processes & Equipment, "Study of Heat Transfer in a Fluidized Bed of Silicon-Copper Alloy in a Model of an Industrial Reactor for the Synthesis of Organochlorosilanes," Jan. 1, 1982.
Müller et al., "Advanced Modeling of Mueller-Rochow Synthesis," Silicon for the Chemical and Solar Industry, 2016.
Feng Zhang et al., "Effect of Gas Distributor on Hydrodynamics and the Rochow Reaction in a Fluidized Bed Membrane Reactor," Industrial & Engineering Research, Sep. 19, 2016.
Pan Zhang et al., "Effect of Bed Characters on the Direct Synthesis of Dimethyldichlorosilane in Fluidized Bed Reactor," Scientific Reports, Mar. 6, 2015.

* cited by examiner

*Primary Examiner* — Pancham Bakshi
(74) *Attorney, Agent, or Firm* — BROOKS KUSHMAN P.C.

(57) ABSTRACT

Organochlorosilanes are produced by reacting, in a fluidized bed reactor, a chloromethane-containing reactant gas with a particulate contact mass containing silicon and a catalyst, wherein the organochlorosilanes have the general formula $(CH_3)_n HSiCl_{4-n-m}$ where n=1 to 3 and m=0 or 1, wherein the process is characterized by three dimensions indices K1-K3, which are respectively associated with the reactor, the contact mass, and the reaction conditions, and which are maintained within specified bounds.

19 Claims, 1 Drawing Sheet

METHOD FOR PREPARING ORGANOCHLOROSILANES

CROSS REFERENCE TO RELATED APPLICATIONS

This application is the U.S. National Phase of PCT Appln. No. PCT/EP2019/056164 filed Mar. 12, 2019, the disclosure of which is incorporated in its entirety by reference herein.

BACKGROUND OF THE INVENTION

1. Field of the Invention

The invention relates to a process for producing organochlorosilanes in a fluidized bed reactor by reaction of a methyl chloride-containing reaction gas with a particulate contact mass containing silicon and a catalyst, wherein the organochlorosilanes have the general formula $(CH_3)_nHSiCl_{4-n-m}$ where n=1 to 3 and m=0 or 1. The design of the fluidized bed reactor is described by an index K1, the constitution of the contact mass by an index K2 and the reaction conditions by an index K3, wherein K1 has a value of 1 to 20, K2 has a value of 0.001 to 200 and K3 has a value of 0.5 to 10 000.

2. Description of the Related Art

The market for silicon products is a rapidly changing environment for the businesses operating within it. Changing demand, rising quality requirements, varying prices of raw materials and energy and stricter regulations require a high degree of operative agility and efficiency to achieve the greatest possible economy.

A particularly important product group is comprised under the technical designation silicones: the substance class of polysiloxanes. Industrial production of silicones is carried out by hydrolysis and subsequent condensation of organochlorosilanes. In industrial silicone chemistry methylsiloxanes dominate and synthesis of the corresponding starting materials, methylchlorosilanes, is therefore of the greatest economic importance. In industry, the latter are produced almost exclusively via the so-called Müller-Rochow direct synthesis (MRDS).

The MRDS generally comprises reacting an organic compound comprising carbon-bonded chlorine, usually methyl chloride (MeCl), and silicon in the presence of a catalyst and optionally suitable promoters, to afford organochlorosilanes, especially methylchlorosilanes (MCS), according to reaction equation (1).

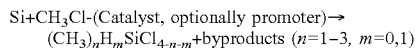

$Si+CH_3Cl\text{-(Catalyst, optionally promoter)}\rightarrow$
$(CH_3)_nH_mSiCl_{4-n-m}+\text{byproducts}$ (n=1–3, m=0,1)

Typical main products and byproducts of the MRDS and their typically occurring proportions are summarized in table 1. Constituents of the byproducts can further include impurities such as hydrocarbons and metal chlorides. This is typically followed by a distillation to produce high-purity organochlorosilanes.

TABLE 1

| Silane | Formula | Typical proportion [% by weight] |
|---|---|---|
| Dimethyldichlorosilane | $(CH_3)_2SiCl_2$ | 75-94 |
| Methyltrichlorosilane | $(CH_3)SiCl_3$ | 3-15 |
| Trimethylchlorosilane | $(CH_3)_3SiCl$ | 2-5 |
| Methyldichlorosilane | $(CH_3)HSiCl_2$ | 0.5-4 |
| Dimethylchlorosilane | $(CH_3)_2HSiCl$ | 0.1-0.5 |
| Tetrachlorosilane | $SiCl_4$ | <0.1 |
| Tetramethylsilane | $(CH_3)_4Si$ | 0.1-1 |
| Trichlorosilane | $HSiCl_3$ | <0.1 |
| Disilane | $(CH_3)_xSi_2Cl_{6-x}$ | 2-8 |

In addition to the highest possible productivity (amount of organochlorosilanes formed per unit time and reaction volume) and the highest possible selectivity—especially based on the fundamentally most important target product dimethyldichlorosilane (DMDCS, $(CH_3)_2SiCl_2$)—the highest possible silicon utilization, associated with secure and also flexible operation of the overall plant, is also demanded. DMDCS is required, for example, for production of linear and cyclic siloxanes which may in turn be further polymerized to produce a broad spectrum of polydimethylsiloxanes.

The MRDS may be performed discontinuously or continuously. In both variants large industrial scale production of the organochlorosilanes is generally carried out via a fluidized bed reaction, wherein the reaction gas containing an organic compound comprising carbon-bonded chlorine simultaneously serves as the fluidization medium. The fluidized bed reaction of the MRDS is a complex process where many different influencing variables and disciplines intersect.

The operational performance (for example expressed by DMDCS selectivity, productivity, low formation of high-boiling byproducts, secondary silane selectivity and/or ratio (secondary silanes are all silanes formed in the MRDS in addition to DMDCS)) of the MRDS generally depends decisively on the reactor design, the operating granulation/the contact mass and also on the established reaction parameters. It is also necessary, especially for a continuous process mode, to introduce the reactant components silicon and MeCl and also the catalysts and optionally promoters into the reactor under the reaction conditions, which is associated with considerable technical complexity. Discontinuous MRDS processes are generally similarly complex. It is therefore important to realize the highest possible productivity—amount of organochlorosilanes formed per unit time and reaction volume—and the highest possible selectivity based on the desired target product (typically DMDCS).

The known processes are generally complex and energy intensive. The required supply of energy, which is generally effected by electrical means, represents a considerable cost factor. The operational performance (for example expressed by the TCS selectivity-weighted productivity, the formation of few high-boiling byproducts) of the LTC in the fluidized bed reactor depends decisively on the establishable reaction parameters. It is also necessary for a continuous process mode to introduce the reactant components silicon, STC and hydrogen into the reactor under the reaction conditions, which is associated with considerable technical complexity. Against this background it is important to realize the highest possible productivity—amount of chlorosilanes formed per unit time and reaction volume—and the highest possible selectivity based on the desired target product (typically TCS) (TCS selectivity-weighted productivity).

Production of organochlorosilanes by MRDS is a dynamic process. An understanding of the underlying dynamics is necessary to achieve the most efficient possible operation and continuous optimization. To this end, high temporal resolution methods may be used for process monitoring.

The labor-intensive determination of the composition of an MRDS product mixture in the laboratory by analysis of withdrawn samples (off-/at-line measurement) is known. However, this is always carried out with a time delay and thus provides, at best, an isolated, retrospective snapshot of a discrete operating state of a fluidized bed reactor. However, if for example the product gas streams from a plurality of reactors are passed to a condensation sector and if only a sample of this condensate mixture is withdrawn, the analytical results do not allow drawing of any concrete conclusions about the operating conditions of the individual reactors.

In order to be able to measure the composition of an MRDS product mixture at higher temporal resolution (preferably separately at each reactor) process analyzers in the gas and/or condensate stream, for example gas chromatographs, may be employed (on-/in-line and/or non-invasive measurement). A general disadvantage here is the limited number of employable instruments on account of the high mechanical stress (abrasion) and the aggressive chemical environment. Further cost factors are the generally high procurement and maintenance costs.

To identify discrete operating states of MRDS reactors it is in principle possible to employ various process-analytical methods which may be categorized as follows (W.-D. Hergeth, On-Line Monitoring of Chemical Reactions: Ullmann's Encyclopedia of Industrial Chemistry, Wiley: Weinheim, Germany 2006).

| Category | Sampling | Sample transport | Analysis |
| --- | --- | --- | --- |
| Off-line | Manual | To remote laboratory | Automatic/manual |
| At-line | Manual discontinuous | To local analytical instrument | Automatic/manual |
| On-line | Automatic | Integrated | Automatic |
| In-line | Integrated | No transport | Automatic |
| Noninvasive | No contact | No transport | Automatic |

The disadvantages of process analyzers may be avoided via a model-based methodology based on so-called soft sensors (virtual sensors). Soft sensors employ continuously collected measured data of operating parameters that are essential to the operation of the process (for example temperatures, pressures, volume flows, fill levels, outputs, mass flows, valve positions). This makes it possible to predict for example concentrations of main products and byproducts.

Soft sensors are based on mathematical equations and are dependency simulations of representative measured values for a target value. In other words, soft sensors model dependencies of correlated measured values and afford a target parameter. The target parameter is thus not directly measured but rather determined using measured values that correlate with it. As applied to the MRDS this means for example that the DMDCS content or DMDCS selectivity is not determined with real measurement sensors (for example process gas chromatograph) but rather is calculated via correlations between operating parameters.

The generation of mathematical equations for soft sensors may be effected by modelling that is fully empirical (for example based on a modified power law model), partially empirical (for example based on kinetic equations for describing a reaction rate) or fundamental (for example based on basic equations of fluid mechanics and kinetics). The mathematical equations may be derived using process simulation programs (for example OpenFOAM, ANSYS or Barracuda) or regression programs (for example MATLAB, Excel VBA or Maple).

SUMMARY OF THE INVENTION

It is an object of the present invention to improve the economy of the MRDS. This object is achieved by a process for producing organochlorosilanes in a fluidized bed reactor by reaction of an MeCl-containing reaction gas with a particulate contact mass containing silicon and a catalyst, wherein the organochlorosilanes have the general formula $(CH_3)_n HSiCl_{4-n-m}$ where n=1 to 3 and m=0 or 1, wherein the process is characterized by three dimensions indices K1-K3, which are respectively associated with the reactor, the contact mass, and the reaction conditions, and which are maintained within specified bounds.

DETAILED DESCRIPTION OF THE PREFERRED EMBODIMENTS

The reactor design is described by a dimensionless index K1, wherein $$K1 = \varphi \cdot \frac{V_{reactor,eff}}{A_{tot,cooled} \cdot d_{hyd}}, \quad \text{(equation 1)}$$

where
$\varphi$=fill level of the reactor,
$V_{reactor,\,eff}$=effective volume of the reactor interior [m$^3$],
$A_{tot,\,cooled}$=sum of cooled surface areas in the reactor [m$^2$] and
$d_{hyd}$=hydraulic reactor diameter[m].

The constitution of the contact mass is described by a dimensionless index K2, wherein $$K2 = R_{Si} \cdot \frac{B_{AK} \cdot \delta_{rel}}{d_{32}}, \quad \text{(equation 4)}$$

where
$B_{AK}$=breadth of the particle size distribution of the contact mass [μm],
$d_{32}$=particle Sauter diameter [μm],
$R_{Si}$=purity of the silicon and
$\delta_{rel}$=relative catalyst distribution in the contact mass.

The reaction conditions are described by a dimensionless index K3, wherein $$K3 = \frac{u_L}{v_F \cdot 10^6} \cdot \frac{p_{diff}}{g} \cdot \frac{1}{\rho_F}, \quad \text{(equation 7)}$$

where
$u_L$=superficial gas velocity [m/s],
$v_F$=kinematic viscosity of the fluid (gaseous reaction mixture in the reactor interior) [m$^2$/s], $\rho_F$=fluid density [kg/m³],
$P_{diff}$=pressure drop over the fluidized bed [kg/m*s²] and
g=acceleration due to gravity [m/s²].

In the process, K1 is specified to have a value from 1 to 30, K2 a value from 0.0005 to 2, and K3 a value from 0.2 to 3000. Within these ranges the productivity of the process is particularly high.

The use of physical and virtual methods of process monitoring made it possible to identify new correlations which make it possible to describe the MRDS via K1, K2 and K3 in such a way that the process is operable in particularly economic fashion through the choice of certain parameter settings and combinations thereof. The process according to the invention allows for integrated, predictive process control in the context of "Advanced Process Control (APC)". If the MRDS is performed in the inventive ranges for K1, K2 and K3, especially via process control systems (preferably APC controllers), the highest possible economic efficiency is achieved. In an integrated system for production of silicon products, especially silicones, this allows the entire production sequence to be optimized and production costs to be reduced.

Figure 1:
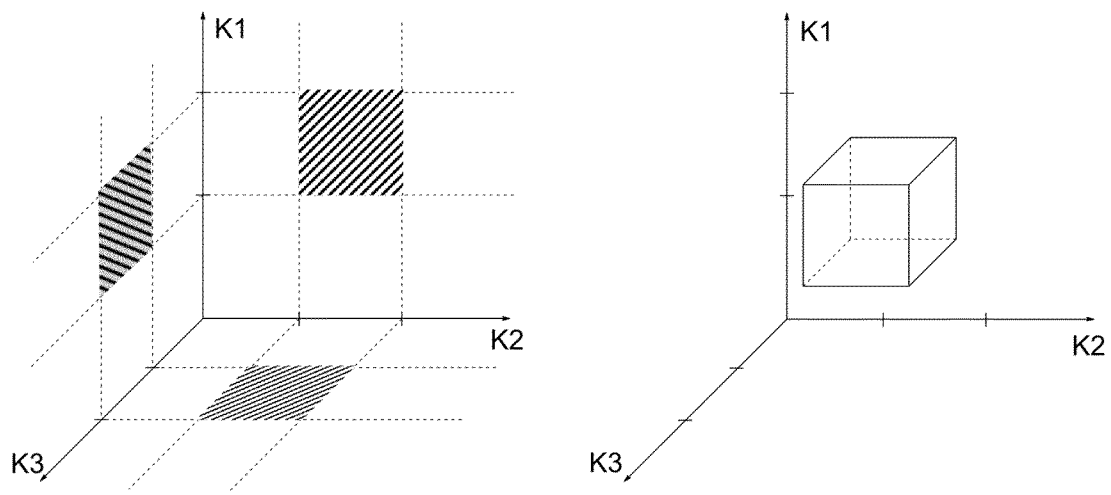
FIG. 1 illustrates a three dimensional operation volume for chlorosilane production.

When plotted in a Cartesian coordinate system the ranges for the indices K1, K2 and K3 span a three-dimensional space which represents a particularly advantageous operating range for the MRDS. Such an operating range is shown schematically in FIG. 1. The process according to the invention especially also simplifies the configuration of new fluidized bed reactors for the MRDS.

Soft sensors additionally allow performance parameters such as for example DMDS selectivity to be shown as a function of K1, K2 and K3. The performance data thus determined in high temporal resolution can be provided to a process control means, in particular a model-predictive control means, as a manipulated variable. This allows the process to be operated in economically optimized fashion.

In a preferred embodiment of the process K1 has a value of 1.2 to 25, preferably of 1.5 to 20.

K2 by preference has a value of 0.001 to 1.75, preferably of 0.001 to 1.2.

K3 by preference has a value of 1 to 2800, preferably of 10 to 2500.

Figure 2:
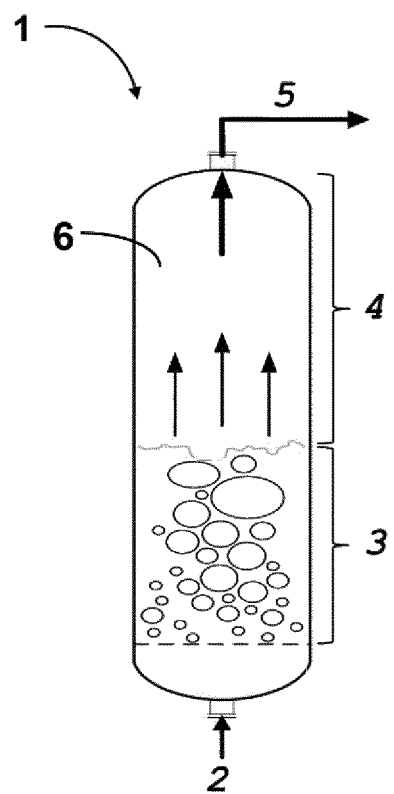
FIG. 2 illustrates a chlorosilane fluidized bed reactor.

FIG. 2 is a schematic diagram of a fluidized bed reactor 1 having a reactor interior 6 for performing the process. The reaction gas 2 is injected into the particulate contact mass preferably from below and optionally from the side (for example tangentially or orthogonally to the gas stream from below), thus fluidizing the particles of the contact mass to form a fluidized bed 3. The reaction is generally initiated by heating the fluidized bed 3 using a heating apparatus (not shown) arranged externally to the reactor. Heating is typically not required during continuous operation. A portion of the particles is transported from the fluidized bed 3 into the empty space 4 above the fluidized bed 3 by the gas flow. The empty space 4 is characterized by a very low solids density and said density decreases in the direction of the reactor outlet. The particle fraction which exits the reactor with the gas flow is referred to as particle discharge 5. Examples of fluidized bed reactors are described in WO 2017/178080 A1 and in B. Kanner, K. M. Lewis, "Commercial Production of Silanes by the Direct Synthesis"; *Studies in Organic Chemistry—Catalyzed Direct Reactions of Silicon*, Elsevier Science Publishers B. V., 1993, 49, 1-46.

K1—the Fill Level-Weighted Reactor Design

The index K1 relates via equation 1 parameters of reactor geometry, namely the effective volume of the reactor interior $V_{reactor,\ eff}$ the sum of the cooled surface areas in the reactor interior $A_{tot,\ cooled}$ and the hydraulic diameter $d_{hyd}$, to the fluidized bed as expressed by the dimensionless fill level $\varphi$.

$V_{reactor,\ eff}$ corresponds to the total volume of the reactor interior minus the volume of all internals. $V_{reactor,\ eff}$ is by preference 1.5 to 2400 m³, more preferably 5 to 1200 m³, and most preferably 12 to 810 m³.

Fluid dynamics investigations in fluidized bed reactors have shown that the geometry of the interior of the fluidized bed reactor can have a decisive effect on fluid dynamics and thus also on productivity. Interior is to be understood as meaning in particular the region that may come into contact with the reaction gas and/or the particles of the contact mass (i.e. in particular both the empty space and the region in which the fluidized bed is formed). The geometry of the interior is determined not only by general constructional features such as height, width, shape (for example cylinder or cone) but also by internals arranged in the interior. The internals may be in particular heat exchanger units, stiffening planes, feeds (conduits) for introducing the reaction gas and apparatuses for distributing the reaction gas (for example gas distributor plates).

The sum of the cooled surface areas in the reactor interior $A_{tot,\ cooled}$ specifies how much surface area can be utilized for heat exchange. For example $A_{tot,\ cooled}$ is made up of the surface areas of a cooling matrix (consisting of individual lances, u-pipes or the like) and a jacket cooler.

The hydraulic diameter $d_{hyd}$ of the fluidized bed reactor is an engineering index which makes it possible to describe fluid-mechanical friction and surface effects of internals, channels or other geometries by attributing these to an equivalent diameter. $d_{hyd}$ is calculated according to equation 2.

$$d_{hyd} = 4 \cdot \frac{A_{q,free}}{U_{tot,wetted}}, \qquad \text{(equation 2)}$$

where
$A_{q,\ free}$=free flow cross section in interior [m²] and
$u_{tot,\ wetted}$=wetted perimeter of all internals [m].

The free flow cross section is the cross section of the portion of the reactor (without internals) in which the fluidized bed is formed.

The hydraulic plant diameter $d_{hyd}$ is preferably 0.1 to 1.5 m, more preferably 0.15 to 1.3 m, and in particular 0.2 to 1.1 m.

The measurement of all objects (diameter of the interior, perimeter of internals, cooled surface areas) may be determined for example by laser measurements/3-D scans (for example ZEISS COMET L3D 2). Such dimensions can typically also be discerned from the reactor manufacturer's literature and/or calculated by reference to design drawings.

The fill level $\varphi$ indicates how much contact mass is present in the reactor interior. $\varphi$ is calculated according to equation 3.

$$\varphi = 10 \cdot \frac{p_{diff}}{\rho_p \cdot g}, \qquad \text{(equation 3)}$$

where
$P_{diff}$=pressure drop over fluidized bed [kg/m*s²] and
$\rho_p$=particle solids density of the contact mass [kg/m³].

The particle solids density $\rho_p$ may be regarded as approximately constant. A typical value is 2336 kg/m$^3$ for example (density of Si at 20° C.). Measurement may be carried out with a pycnometer.

The pressure drop over the fluidized bed $p_{diff}$ is preferably 10,000 to 200,000 kg/m*s$^2$, more preferably 20,000 to 150,000 kg/m*s$^2$, and in particular 50,000 to 130,000 kg/m*s$^2$. To determine $P_{diff}$ the pressure can be measured both in a feed conduit for the reaction gas and in a discharge conduit for the offgas for example with a manometer. $P_{diff}$ is the difference.

K2—The Constitution of the Contact Mass

K2 describes via equation 4 the constitution, in particular the granulation, of the employed particulate contact mass.

K2 is made up of the dimensionless purity of the silicon $R_{Si}$, the breadth of the particle size distribution of the contact mass $B_{AK}$, the Sauter diameter $d_{32}$ and the relative catalyst distribution in the contact mass $\delta_{rel}$. $B_{AK}$ is derived according to equation 5.

$$B_{AK}=d_{90}-d_{10} \quad \text{(equation 5)}$$

$d_{10}$ [µm] is a measure for the size of the relatively small particles and the value $d_{90}$ [µm] is a measure for the relatively large particles in the fraction or granulation mixture. $d_{10}$ and $d_{90}$ are generally important parameters for the characterization of a particle size distribution. For example, the value $d_{10}$ means that 10% of all particles are smaller than the recited value. The value $d_{50}$ is moreover defined as the median particle size (cf. DIN 13320).

The values for $d_{10}$ and $d_{90}$ are preferably chosen such that a breadth of the particle size distribution of the contact mass $B_{AK}$ of 10 to 1000 µm, preferably 20 to 900 µm, more preferably 30 to 800 µm, is obtained.

The Sauter diameter $d_{32}$ is the mean, equal-volume particle diameter of the contact mass and is preferably 5 to 350 µm, more preferably 10 to 300 µm, and most preferably 10 to 250 µm.

Determination of the breadth of the particle size distribution/of the Sauter diameter may be carried out according to ISO 13320 (laser diffraction) and/or ISO 13322 (image analysis). Calculation of average particle sizes/diameters from particle size distributions may be carried out according to DIN ISO 9276-2.

The relative catalyst distribution in the contact mass $\delta_{rel}$ is a measure of the wetting/general wettability of the particulate contact mass with the catalyst. The term catalyst is to be understood as especially also including mixtures of different catalysts and mixtures of catalysts and promoters that may be added to the fluidized bed reactor. Accordingly, $\delta_{rel}$ can also be a measure of the wetting of the particulate contact mass with a catalyst mixture or a catalyst-promoter mixture.

$\delta_{rel}$ may be calculated according to equation 6.

$$\delta_{rel} = \lambda \cdot \frac{O_{spec,cat}}{O_{spec,SiG}}, \quad \text{(equation 6)}$$

where
$\lambda$=mass ratio of catalyst/silicon granulation or catalyst loading,
$O_{spec,\,cat}$=average specific surface area of the catalyst [m$^2$/kg] and
$O_{spec,\,SiG}$=average specific surface area of the silicon granulation [m$^2$/kg].

The relative catalyst distribution in the contact mass $\delta_{rel}$ is by preference 0.001 to 0.6, more preferably 0.015 to 0.5, and most preferably 0.003 to 0.2.

The average specific surface area may for example be determined by gas adsorption according to the BET method (ISO 9277).

A "granulation" is in particular to be understood as meaning a mixture of silicon particles obtainable for example by comminution of chunk silicon, in particular metallurgical silicon ($Si_{mg}$), by means of crushing and milling plants. The chunk silicon may have an average particle size of >10 mm, preferably >20 mm, more preferably >50 mm. The maximum average particle size is preferably 500 mm. Granulations may be classified into fractions essentially by sieving and/or sifting.

Granulations are producible by/from
crushing and milling of chunk silicon; subsequent optional sieving and/or sifting (classifying),
wastes, in particular in the form of dusts that are generated in the processing (crushing, milling, sawing) of various silicon types (wafers, polycrystalline/multicrystalline/single-crystal silicon, $Si_{mg}$) and may be classified; in the form of oversize and/or undersize, wherein these are fractions which are outside the target particle size,
processes for producing granulated $Si_{mg}$ or polysilicon and co-generated material thus formed, in particular silicon dusts (average particle diameter <10 µm, optionally processed (compacting/agglomerating), for example in the form of pellets).

A mixture of different granulations may be referred to as a granulation mixture and the granulations of which the granulation mixture consists may be referred to as granulation fractions. Granulation fractions may be categorized relative to one another into coarse grain fractions and fine grain fractions. More than one granulation fraction may in principle be categorized as a coarse grain fraction and/or a fine grain fraction in the case of a granulation mixture. The granulation introduced into the fluidized bed reactor may be referred to as the operating granulation. The contact mass is generally the granulation mixture which is brought into contact with the reaction gas in the reactor.

The contact mass is in particular a granulation mixture. The contact mass preferably comprises no further components in addition to silicon, the catalyst and optionally promoter. It is preferably silicon containing not more than 5% by weight, more preferably not more than 2% by weight, in particular not more than 1% by weight, of other elements as impurities. It is preferably $Si_{mg}$ which typically has a purity of 98% to 99.9%. A typical composition comprises for example 98% silicon, wherein the remaining 2% are generally largely composed of the elements: Fe, Ca, Al, Ti, Cu, Mn, Cr, V, Ni, Mg, B, C, P and O. Further elements that may be present include: Co, W, Mo, As, Sb, Bi, S, Se, Te, Zr, Ge, Sn, Pb, Zn, Cd, Sr, Ba, Y and Cl. The specified purity of silicon is accordingly to be understood such that in the silicon sample to be measured the content of the recited elements is determined and the sum of these is then used to calculate the purity (for example in % by weight). If a total content of impurities of 2% by weight is determined, this equates to a silicon content of 98% by weight. The use of silicon having a lower purity of 75% to 98% by weight is however also possible. However the silicon content is by preference greater than 75% by weight, more preferably greater than 85% by weight, and most preferably greater than 95% by weight.

The catalyst may be one or more elements from the group comprising Fe, Cr, Ni, Co, Mn, W, Mo, V, P, As, Sb, Bi, O, S, Se, Te, Ti, Zr, C, Ge, Sn, Pb, Cu, Zn, Cd, Mg, Ca, Sr, Ba, B, Al, Y, Cl. The catalyst is preferably selected from the group comprising Fe, Al, Ca, Ni, Mn, Cu, Zn, Sn, C, V, Ti, Cr, B, P, O, Cl and mixtures thereof. These catalytically active, and in some cases also promoting, elements may already be present in silicon in a certain proportion as an impurity, for example in oxidic or metallic form, as silicides or in other metallurgical phases or as oxides or chlorides. The proportion thereof depends on the purity of the silicon employed. However it is also possible, through preforming, to specifically produce silicon containing a catalyst mixture or a catalyst-promoter mixture.

The catalyst may be added to the contact mass in metallic, alloyed and/or salt-like form. Chlorides and/or oxides of the catalytically active elements in particular may be employed. Preferred compounds are CuCl, $CuCl_2$, CuP, CuO or mixtures thereof. The contact mass may further contain promoters, for example Zn and/or $ZnCl_2$ and/or Sn.

The elemental composition of the employed silicon and of the contact mass may be determined for example by x-ray fluorescence analysis.

Based on silicon the catalyst is preferably present in a proportion of 0.1% to 20% by weight, more preferably of 0.5% to 15% by weight, in particular of 0.8% to 10% by weight, and especially of 1% to 5% by weight.

K3—Reaction Conditions

The index K3 relates the most important parameters of the MRDS to one another via equation 7. Contained therein are the superficial gas velocity $u_L$, the pressure drop over the fluidized bed $\rho_{diff}$, the kinematic viscosity of the fluid $v_F$ and the fluid density $\rho_F$. Fluid is to be understood as meaning the gaseous reaction mixture in the reactor interior.

The superficial gas velocity $u_L$ is by preference 0.002 to 0.4 m/s, more preferably 0.005 to 0.36 m/s, most preferably 0.008 to 0.32 m/s.

The fluid density $\rho_F$ and the kinematic viscosity $v_F$ may be determined by simulations of (phase) equilibrium states using software. These simulations are typically based on adapted equations of state which for varying physical parameters (for example p and T) draw on actually measured compositions of the reaction mixture both in the gas phase and in the liquid phase. Such a simulation model may be validated using actual operating states/parameters
and allows specification of operating optima in respect of the parameters $\rho_F$ and $v_F$.

Determination of phase equilibria may be carried out for example using a measurement apparatus (for example modified Rock and Sieg recirculation apparatus, for example MKS Baratron Type 690, MKS Instruments). Variation of physical influencing variables such as pressure and temperature bring about changes of state for a substance mixture. The different states are subsequently analyzed and the component composition determined, for example with a gas chromatograph. Computer-aided modeling can be used to adapt equations of state to describe phase equilibria. The data are transferred into software programs so that phase equilibria can be calculated.

Kinematic viscosity is a measure of momentum transfer perpendicular to the flow direction in a moving fluid. The kinematic viscosity $v_F$ may be described via dynamic viscosity and fluid density. Density may be approximated for example via the Rackett equation for liquids and via an equation of state, for example Peng-Robinson, for gases. Measurement of density may be carried out with a digital density measuring instrument (for example Anton Paar DMA 58) using the torsion pendulum method (eigenfrequency measurement).

The fluid density $\rho_F$ is preferably in a range from 1 to 5 kg/m$^3$.

The kinematic viscosity $v_F$ is preferably in a range from $3*10^{-6}$ to $2.5*10^{-5}$ m$^2$/s.

The absolute pressure in the fluidized bed reactor at which the process according to the invention is preferably performed is 0.05 to 1 MPa, more preferably 0.08 to 0.8 MPa, and in particular 0.1 to 0.6 MPa.

The process is preferably performed in a temperature range from 220° C. to 400° C., more preferably 250° C. to 380° C., and in particular 280° C. to 350° C.

The reaction gas preferably contains at least 50 vol %, more preferably at least 70 vol %, and in particular at least 90 vol %, of MeCl before entry into the reactor.

The reaction gas may further contain one or more components selected from the group comprising chlorosilanes, methylchlorosilanes, HCl, $H_2$, $CH_4$, $C_2H_6$, CO, $CO_2$, $O_2$ and $N_2$. These components may be present as impurities in a recycled gas for example.

The reaction gas may further contain a carrier gas, for example nitrogen or a noble gas such as argon.

The composition of the reaction gas is typically determined before supplying to the reactor via Raman and infrared spectroscopy and also gas chromatography. This may be done either via samples taken in the manner of spot checks and subsequent "off-line analyses" or else via "on-line" analytical instruments connected to the system.

The process is preferably part of an integrated system for producing polysiloxanes. The process may further be part of an integrated system for producing silicone elastomers, silicone oils, functional siloxanes, silicone resins, silicone resin formulations, linear and cyclic polydimethylsiloxanes, silicates, organofunctionalized silanes, chlorosilanes and polysilicon.

EXAMPLES

In order to apply the findings and correlations to productivity in the production of organochlorosilanes and to define the ranges for the indices K1, K2 and K3 (operating ranges), detailed investigations on continuously and discontinuously operated fluidized bed reactors of different sizes were performed.

Various experiments V were performed (table 2: V1 to V15), wherein the following were varied in each case: the hydraulic plant diameter $d_{hyd}$ with values from 0.1 m to 1.5 m, the superficial gas velocity $u_L$ with values from 0.0015 to 0.5 m/s, the particle Sauter diameter $d_{32}$ with values from 5 μm to 1000 μm, the breadth of the operating granulation $B_{AK}$ with values from 10 to 1000 μm and the relative catalyst distribution over the contact mass $\delta_{rel}$ with values of 0.0002 to 3, the purity of the silicon with values of 0.75 to 0.99999, the catalyst loading λ with values of 0.0004 to 0.6 and the pressure drop over the fluidized bed $P_{diff}$ with values of 10,000 to 230,000 kg/m*s$^2$.

The particle solids density $\rho_p$ may be considered to be approximately constant, for example at 2336 kg/m$^3$. The fluid density $\rho_F$ is typically in a range from 1 to 5 kg/m$^3$. The kinematic viscosity $v_F$ is typically in a range from $3*10^{-6}$ to $2.5*10^{-5}$ m$^2$/s.

The indices K1, (equation 1), K2 (equation 4) and K3 (equation 7) were derived from the chosen/specified parameters. The productivity [kg/(kg*h)], i.e. the produced amount of organochlorosilanes per hour [kg/h] based on the amount of contact mass (operating granulation) employed in the reactor [kg], was used as a basis for evaluating the selected combinations of K1, K2 and K3 and for defining the optimal ranges. A productivity of >0.15 kg/(kg*h) based on the amount of organochlorosilane product mixture is considered optimal/acceptable. V1 to V15 are recited as representatives of a multiplicity of experiments performed to determine the optimal ranges. Productivity is not satisfactory in the experiments V1, V2, V10, V11 and V15. A multiplicity of such negative examples was used to determine the optimal ranges of the parameters underlying the indices. The ranges recited at the start of the example are therefore wider than the claimed ranges.

TABLE 2

| Experiment | K1 | K2 | K3 | Productivity |
|---|---|---|---|---|
| V1 | 0.93 | 0.0002 | 0.12 | 0.002 |
| V2 | 0.93 | 0.09 | 748.3 | 0.091 |
| V3 | 10.3 | 0.09 | 748.3 | 0.271 |
| V4 | 14.1 | 0.09 | 748.3 | 0.369 |
| V5 | 22.5 | 0.09 | 748.3 | 0.235 |
| V6 | 31.1 | 0.09 | 748.3 | 0.073 |
| V7 | 14.1 | 0.0002 | 748.3 | 0.056 |
| V8 | 14.1 | 0.003 | 748.3 | 0.217 |
| V9 | 14.1 | 0.09 | 748.3 | 0.357 |
| V10 | 14.1 | 2.5 | 748.3 | 0.148 |
| V11 | 14.1 | 0.09 | 0.12 | 0.142 |
| V12 | 14.1 | 0.09 | 90 | 0.243 |
| V13 | 14.1 | 0.09 | 748 | 0.378 |
| V14 | 14.1 | 0.09 | 2040 | 0.185 |
| V15 | 14.1 | 0.09 | 3129 | 0.133 |

The experiments demonstrate that MRDS makes it possible to produce organochlorosilanes with particularly high productivity when the process is performed in the optimal ranges of the indices K1, K2 and K3.

The invention claimed is:

1. A process for producing organochlorosilanes in a fluidized bed reactor, comprising:
reacting a methyl chloride-containing reaction gas with a particulate contact mass containing silicon and a catalyst, wherein the organochlorosilanes have the formula $(CH_3)_n H_m SiCl_{4-n-m}$ where n=1 to 3 and m=0 or 1, wherein
a) the reactor is described by an index, $$K1 = \varphi \cdot \frac{V_{reactor,eff}}{A_{tot,cooled} \cdot d_{hyd}} \quad \text{(equation 1)}$$

where
$\varphi$=fill level of the reactor,
$V_{reactor,\,eff}$=effective reactor volume [m$^3$],
$A_{tot,\,cooled}$=sum of cooled surface areas in the reactor [m$^2$],
$d_{hyd}$=hydraulic reactor diameter [m],
wherein $V_{reactor,\,eff}$ is 1.5 to 2400 m$^3$ and $d_{hyd}$ is 0.1 to 1.5 m;
b) the constitution of the contact mass is described by an index $$K2 = R_{Si} \cdot \frac{B_{AK} \cdot \delta_{rel}}{d_{32}}, \quad \text{(equation 4)}$$

where
$B_{AK}$=breadth of the particle size distribution of the contact mass [µm],
$d_{32}$=particle Sauter diameter [µm],
$R_{Si}$=purity of the silicon,
$\delta_{rel}$=relative catalyst distribution in the contact mass,
wherein $\delta_{rel}$ is 0.001 to 0.6, $d_{32}$ is 5 to 350 µm, $B_{AK}$ is 10 to 1000 µm and $R_{Si}$ is 0.75 to 0.99999;
c) the reaction conditions for the reaction of organochlorosilanes with silicon are described by an index $$K3 = \frac{u_L}{v_F \cdot 10^6} \cdot \frac{p_{diff}}{g} \cdot \frac{1}{\rho_F}, \quad \text{(equation 7)}$$

where
$u_L$=superficial gas velocity [m/s],
$v_F$=kinematic viscosity of the fluid [m$^2$/s],
$\rho_F$=fluid density [kg/m$^3$],
$p_{diff}$=pressure drop over the fluidized bed [kg/m*s$^2$],
g=acceleration due to gravity [m/s$^2$],
wherein $p_{diff}$ is 10,000 to 200,000 kg/m*s$^2$, $u_L$ is 0.002 to 0.4 m/s, $\rho_F$ is 1 to 5 kg/m$^3$ and $v_F$ is $3*10^{-6}$ to $2.5*10^{-5}$ m$^2$/s;
and wherein K1 has a value of 1 to 30, K2 has a value of 0.0005 to 2 and K3 has a value of 0.2 to 3000, and maintaining the values of K1, k2, and K3 within the specified values.

2. The process of claim 1, wherein K1 has a value of 1.2 to 25.

3. The process of claim 1, wherein K1 has a value of 1.5 to 20.

4. The process of claim 1, wherein K2 has a value of 0.001 to 1.75.

5. The process of claim 1, wherein K2 has a value of 0.001 to 1.2.

6. The process of claim 2, wherein K2 has a value of 0.001 to 1.75.

7. The process of claim 1, wherein K3 has a value of 1 to 2800.

8. The process of claim 1, wherein K3 has a value of 10 to 2500.

9. The process of claim 2, wherein K3 has a value of 1 to 2800.

10. The process of claim 1, wherein the effective reactor volume $V_{reactor,\,eff}$ is 5 to 1200 m$^3$.

11. The process of claim 1, wherein the hydraulic plant diameter $d_{hyd}$ is 0.15 to 1.3 m.

12. The process of claim 1, wherein the pressure drop over the fluidized bed $p_{diff}$ is 20 000 to 150,000 kg/m*s$^2$.

13. The process of claim 1, wherein the particle Sauter diameter $d_{32}$ is 10 to 300 µm.

14. The process of claim 1, wherein the breadth of the particle size distribution of the contact mass $B_{AK}$ is 20 to 900 µm.

15. The process of claim 1, wherein the relative catalyst distribution in the contact mass $\delta_{rel}$ is 0.015 to 0.5.

16. The process of claim 1, wherein at least one catalyst is selected from the group consisting of Fe, Cr, Ni, Co, Mn, W, Mo, V, P, As, Sb, Bi, O, S, Se, Te, Ti, Zr, C, Ge, Sn, Pb, Cu, Zn, Cd, Mg, Ca, Sr, Ba, B, Al, Y, Cl and mixtures thereof.

17. The process of claim 1, wherein the contact mass contains at least one promoter.

18. The process of claim 1, wherein the superficial gas velocity $u_L$ is 0.005 to 0.36 m/s.

19. The process of claim 1, wherein the reaction gas contains at least 50 vol % of methyl chloride before entry into the reactor.

* * * * *